March 10, 1959
T. D. REEDY
2,876,794
PRESSURE RESPONSIVE VALVE STRUCTURE
Filed Jan. 25, 1954
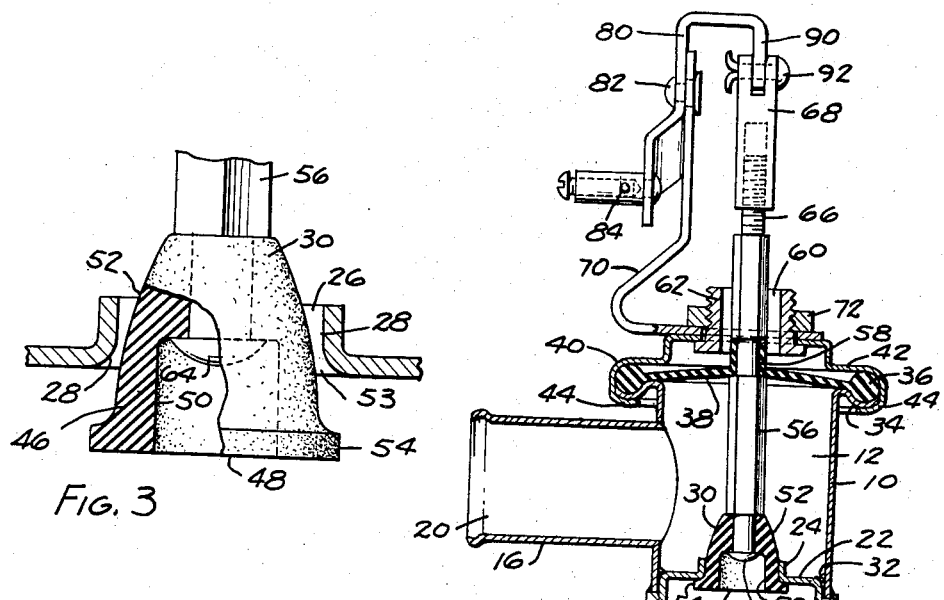
FIG. 3
FIG. 1
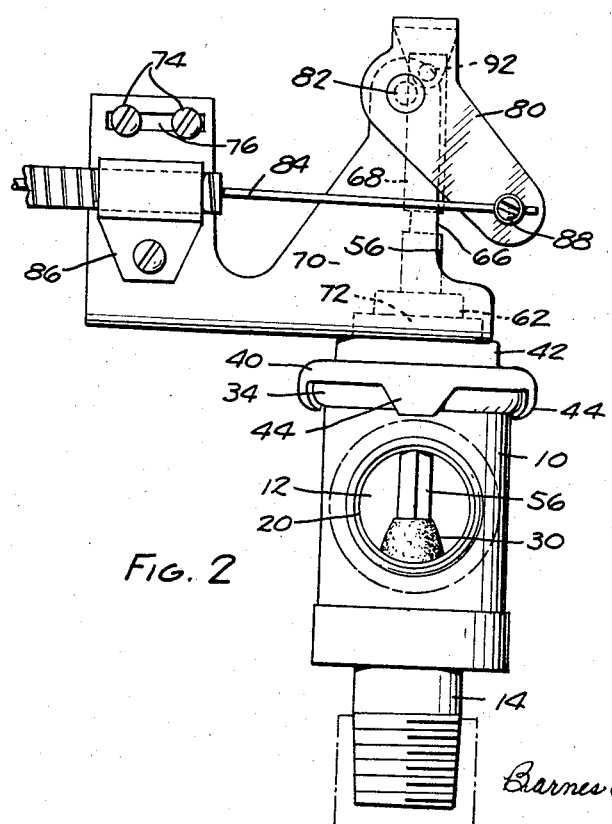
FIG. 2
INVENTOR.
THOMAS D. REEDY
BY
Barnes, Kisselle, Laughlin & Raisch
ATTORNEYS.

United States Patent Office 2,876,794
Patented Mar. 10, 1959

2,876,794

PRESSURE RESPONSIVE VALVE STRUCTURE

Thomas D. Reedy, Detroit, Mich., assignor, by mesne assignments, to Chamberlin Products Corporation, Detroit, Mich., a corporation of Indiana Application January 25, 1954, Serial No. 405,690

8 Claims. (Cl. 137—517)

This invention relates to a valve for providing a rate of flow of fluid of uniform or substantially constant nature through a line downstream of the valve despite changes in the pressure of the fluid upstream of the valve.

An exemplary application of the valve lies in an automobile heater of the type utilizing a radiator connected into the engine cooling system of the automobile and a fan for moving air through the radiator. The coolant is circulated through the cooling system and through the heater radiator by a pump driven by the engine. The coolant passes through the heater radiator rapidly or slowly depending on how fast the engine is running. This results in an undesirable variation of temperature in the heater which can be rectified by providing for flow of coolant through the radiator at a relatively constant rate despite variations in engine speed, or, more specifically, despite fluid pressure variations upstream of the heater radiator.

It is an object of this invention to provide a simple, inexpensive and durable valve structure facilitating delivery of fluid downstream at a relatively uniform or constant rate of flow despite upstream variations in fluid pressure. The invention is carried out generally by means of a resilient valve member which flexes responsively to upstream pressure variations, whereby to vary the size of the valve orifice. One form of the invention is illustrated in the accompanying drawings:

Fig. 1 is a sectional view of a valve made in accordance with this invention.

Fig. 2 is an elevational view of the valve and an operating device therefor.

Fig. 3 is an enlarged view of the valve member and valve opening showing a partially open valve position.

The valve shown in the drawings has a body 10 defining a chamber 12 and has extensions 14 and 16 respectively defining an inlet 18 and an outlet 20 communicating into the chamber 12. The body 10 is preferably formed of sheet metal. Mounted within the chamber 12 intermediate the inlet and outlet is a baffle 22 having a central, axially extending annular flange 24 defining a valve opening 26 and providing a seat 28 for a valve member 30. The baffle may comprise a simple stamping and may be welded to the body as shown at 32. The inlet extension 14 may also be fixed on the body by weld 32.

At one end of the body 10 is a radially outwardly extending flange 34 of dished form. An annular bead 36 on a flexible diaphragm 38 is clamped in the dished portion of the flange 34 by the peripheral region 40 of a cap 42 fixed over the end of the valve body 10. The cap 42 is secured to the valve body by such means as circumferentially arranged fingers 44 snugly engaging the dished flange 34. The diaphragm is made of such a material as natural or synthetic rubber and seals the end of the chamber 12.

The valve member 30 preferably has a hollow portion 46 with an open end 48 positioned upstream of the valve opening 26 so that the interior surface 50 of the hollow portion is subjected to the pressure of the fluid in the inlet 18. The valve member has a tapering exterior surface 52 and an exterior annular shoulder 54 which cooperate with the valve seat 28 to adjustably open and close the valve. The valve member is made of a resiliently expandable material such as a natural rubber, an elastomer or synthetic rubber, or a resilient polymeric plastic.

A valve stem 56 is fixed on the valve member 30 and extends through a tightly fitting, pressure-sealing sleeve portion 58 of the diaphragm 38 and through an opening 60 in a fitting 62 on the cap 42. The valve stem 56 may have the form of a relatively long slender bolt having a head 64 engaging a portion of the interior surface 50 of the valve member and having a threaded end portion 66 exterior of the valve for engaging an element 68.

Support means for the valve may comprise a bracket 70 secured to the cap 42 by a nut 72 threaded onto the fitting 62 as shown, the bracket being attachable to a support by such means as screws 74 extending through an opening 76 therein.

The valve is adjustably opened and closed by shifting the valve stem 56 and the valve member 30 thereon in an axial direction. Operating means for the valve may include a rocker arm 80 pivoted on the bracket 70 as shown at 82 and actuated by a manually or automatically controlled Bowden wire 84 supported on the bracket by a clip 86 and fastened to one end portion 88 of the rocker arm as shown. The other end 90 of the rocker arm is connected by a pivot 92 to the element 68 threaded onto the valve stem 56. The pivots 82 and 92 are eccentric so that when the rocker arm is actuated by the Bowden wire 84 the valve stem 56 is moved in a generally axial direction thereby shifting the valve member 30 relatively to its seat 28. The threaded element 68 provides an adjustable extension of the valve stem 56 for fine adjustment of the operating linkage.

In the closed position of the valve illustrated in Figs. 1 and 2, the valve member 30 engages the seat 28. The external surface 52 engages wtihin the seat and the shoulder 54 engages the seat on the upstream side.

To open the valve the rocker arm 80 is rocked by means of the Bowden wire 84 to shift the valve stem 56 and thereby move the valve member 30 axially relatively to its seat 28. Since the exterior surface 52 of the valve member is tapered, such movement of the valve member leaves an annular orifice 53 (Fig. 3) between the valve member and valve seat and this orifice increases in size as the member is moved further from its closed position. The rate of flow of fluid through the valve thus depends upon the position of the valve member relatively to the valve seat. Fig. 3 illustrates a partly opened valve position. To close the valve the rocker arm 80 is rocked to return the valve stem 56 and valve element 30 to the Fig. 1 position. The diaphragm 38 flexes with opening and closing axial movements of the valve stem 56. The opening 60 in the fitting 62 is large enough to accommodate arcuate movement of the stem 56 due to the pivotal action, and the diaphragm 38 elastically and resiliently yields to this lateral motion.

Considering an open position of the valve as shown in Fig. 3; if the upstream fluid pressure should increase, that pressure will act upon the interior surface 50 of the valve member 30. At the same time the fluid velocity through the annular orifice 53 increases and there is a commensurate decrease of pressure acting upon that portion of the exterior surface 52 of the valve member which defines the orifice. This increased pressure differential expands the hollow portion 46 of the valve member 30 and decreases the size of the valve orifice 53, thereby maintaining the rate of flow through the valve more uniform or constant despite the increased pressure in the fluid line upstream of the valve.

When fluid pressure upstream of the valve decreases, the pressure acting on the interior surface 50 of the valve member also decreases. At the same time the velocity of flow of the fluid through the orifice 53 decreases and there is a commensurate increase of fluid pressure acting on the exterior surface 52 of the valve member in the region of the orifice. Under this diminished pressure differential the hollow portion 46 of the valve member 30 resiliently contracts, thereby enlarging the orifice 53.

Thus, for a given setting of the valve, the rate of flow therethrough does not vary in accordance with variations in the upstream pressure, but is of a more uniform nature despite such variations in pressure.

I claim:

1. A pressure responsive valve for controlling the flow of fluids comprising, a valve body having an inlet and an outlet, means on the valve body forming a valve opening intermediate the inlet and outlet, a valve member shiftable to open and close the valve opening, the valve member including a hollow element with a circumferential wall having an inner surface positioned to be subjected to the pressure of fluid in the inlet and having an outer surface spaced radially inwardly of said means forming the valve opening and cooperating therewith to form a restricted orifice in an open position of the valve, so that when fluid flows by said element the pressures on said surfaces of the hollow element are unequal, said wall being supported generally free of external restraint and being resiliently flexible in a direction generally radial of said valve opening responsively to such pressure differential, whereby said restricted orifice varies inversely as the pressure in the inlet.

2. A pressure responsive valve for controlling the flow of fluids comprising, a valve body having an inlet and an outlet, means on the valve body forming a valve opening intermediate the inlet and outlet, a valve member shiftable to open and close the valve opening, the valve member including a hollow element with a circumferential wall having an inner surface positioned to be subjected to the pressure of fluid in the inlet and having an opposing outer surface spaced radially inwardly of said means forming the valve opening and cooperating therewith to form a restricted orifice in an open position of the valve, so that when fluid flows by said element the pressures on said surfaces of the hollow element are unequal, said wall being supported generally free of external restraint and being resiliently flexible in a direction generally radial of said valve openings responsively to such pressure differential, whereby said restricted orifice varies inversely as the pressure in the inlet.

3. A pressure responsive valve for controlling the flow of fluids, comprising, a valve body having an inlet and an outlet, means on the valve body forming a valve seat intermediate the inlet and outlet, the valve seat having an axially extending portion defining a valve opening, a tapered valve member shiftable axially to open and close the valve opening, said tapered valve member being of hollow form which opens on the inlet side of the valve seat and having an inner surface positioned to be subjected to the pressure of fluid in the inlet and having an outer surface spaced radially inwardly of said valve opening, said outer surface cooperating with said axially extending portion to form a restricted orifice in an open position of the valve, so that when fluid flows by said member the pressures on said surfaces are unequal, the portion of said valve member between said inner and outer surfaces being supported generally free of external restraint and being resiliently expansible in a generally radial direction toward said axially extending portion responsively to such pressure differential, whereby said restricted orifice varies inversely as the pressure in the inlet, a portion of the outer surface of the valve member being snugly engageable with said axially extending portion, thereby providing a pressure sealed closed position for the valve.

4. A pressure responsive valve for controlling the flow of fluids comprising, a valve body having an inlet and an outlet, means on the valve body forming a valve seat intermediate the inlet and outlet, the valve seat having an axially extending portion defining valve opening, a tapered valve member shiftable axially to open and close the valve opening, said tapered valve member being of hollow form which opens on the inlet side of the valve seat and having an inner surface positioned to be subjected to the pressure of fluid in the inlet and having an outer surface spaced radially inwardly of said value opening, said outer surface cooperating with said axially extending portion to form a restricted orifice within said valve opening in an open position of the valve, so that when fluid flows by said member the pressures on said surfaces are unequal, the portion of said valve member between said inner and outer surfaces being supported generally free of external restraint and being resiliently expansible in a generally radial direction toward said axially extending portion responsively to such pressure differential, whereby said restricted orifice varies inversely as the pressure in the inlet, a portion of the outer surface of the valve member being snugly engageable with said axially extending portion, thereby providing a closed position for the valve.

5. A valve for controlling flow of liquid comprising, a member having a port therein for the flow of liquid therethrough and which constitutes a valve seat, a valve member having a circumferential flange of resilient material defining a cavity facing upstream, said flange extending in a direction generally axial of said port, means on the flange for engaging the seat on the upstream side thereof to close the valve, means for shifting the valve member in an upstream direction to open the port, the upstream pressure being exerted generally radially on the internal walls of the flange and a lower pressure adjacent the opening of the port being exerted generally radially inwardly on the external surfaces of the flange, said flange being supported generally free of lateral restraint, so that the resilient flange is caused to expand in a direction generally radial of said port with a rise of pressure on the upstream side and contract in a direction generally radial of said port with a lowering of the pressure on the upstream side, whereby the flow of liquid through the valve is relatively uniform irrespective of pressure changes on the upstream side of the port.

6. The valve defined in claim 5 wherein said cavity extends at least partially into said port in an open position of said valve.

7. A valve for controlling flow of fluid comprising, a member having a port therein for the flow of liquid therethrough and which constitutes a valve seat, a valve member having the form of a cup with a closed end, a generally annular wall and an open end, said valve member being supported within said port and being operable to open and close the same, a portion of said cup adjacent said closed end lying within said port in an open position of said valve, the outer surface of said wall being spaced radially inwardly from said valve seat in an open position of said valve to define an orifice so that said outer surface is subjected to the radially inward pressure of fluid passing through said orifice, said open end of said cup being positioned upstream of said port in said open position of said valve so that the interior of said cup is subject to the radially outward pressure of fluid at said upstream location, said wall being radially unsupported between said closed end and said open end so that said walls may reflex freely in a generally radial direction toward and away from said valve seat responsively to pressure differentials thereon for regulating the size of said orifice, whereby the flow of liquid through the valve is relatively uniform irrespective of pressure changes on the upstream side of said port.

8. A valve for controlling the flow of liquid comprising, a member having a port therein for the flow of liquid therethrough and which constitutes a valve seat, means forming a valve member operable to open and close said port and having a resilient portion supported for generally freely flexing in a generally radial direction toward and away from the walls of the port in an open position of said valve, said portion having a first surface spaced radially of and cooperating with the port walls to define an orifice in an open position of said valve so that said surface is subjected to the radially inward pressure of the fluid in the orifice, said portion having a second surface arranged and constructed to be subjected to radially outward pressure of the fluid upstream of said port, said surfaces being arranged so that force on said second surface is transmitted through said portion toward said first surface in a direction toward the port walls so that said portion flexes in a generally radial direction toward and away from said port walls responsively to changing pressure differentials thereat for changing the size of said orifice, whereby the flow of liquid through the valve is relatively uniform irrespective of pressure changes on the upstream side of said port.

References Cited in the file of this patent

UNITED STATES PATENTS

| | | |
|---|---|---|
| 1,303,472 | Haas | May 13, 1919 |
| 2,106,775 | Trask | Feb. 1, 1938 |
| 2,559,405 | Crevatin | July 3, 1951 |
| 2,638,929 | Delany | May 19, 1953 |
| 2,648,518 | Curtis | Aug. 11, 1953 |
| 2,659,566 | Rand | Nov. 17, 1953 |
| 2,659,567 | Rand | Nov. 17, 1953 |
| 2,764,183 | Gollehon | Sept. 25, 1956 |
| 2,777,464 | Mosely | Jan. 15, 1957 |